US012659981B2

(12) United States Patent
Dubey et al.

(10) Patent No.: US 12,659,981 B2
(45) Date of Patent: Jun. 16, 2026

(54) METHOD AND APPARATUS FOR DOWNLINK-CREDIT DISTRIBUTION PROTOCOL (DL-CDP) IN WIRELESS COMMUNICATION

(71) Applicant: Apple Inc., Cupertino, CA (US)

(72) Inventors: Amit Dubey, San Diego, CA (US); Vinay Rajkumar Patil, San Jose, CA (US); Darshan Bharat Ashar, Milpitas, CA (US); Vijay Venkataraman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 616 days.

(21) Appl. No.: 18/184,885

(22) Filed: Mar. 16, 2023

(65) Prior Publication Data

US 2024/0314826 A1     Sep. 19, 2024

(51) Int. Cl.
*H04W 72/50*      (2023.01)
*H04W 72/1273*      (2023.01)

(52) U.S. Cl.
CPC ..... *H04W 72/535* (2023.01); *H04W 72/1273* (2013.01)

(58) Field of Classification Search
CPC ... H04L 47/125; H04L 41/0894; H04L 43/08; H04L 43/0882; H04L 43/16; H04L 47/15; H04L 47/22; H04L 47/2441; H04L 47/39; H04L 47/50; H04W 28/0268; H04W 28/0289; H04W 24/08; H04W 28/0236
See application file for complete search history.

(56) References Cited

U.S. PATENT DOCUMENTS

| | | | | |
|---|---|---|---|---|
| 11,856,044 | B1 * | 12/2023 | Sohani | H04L 65/752 |
| 11,868,287 | B2 * | 1/2024 | Lam | G06F 9/5038 |
| 2016/0269928 | A1 * | 9/2016 | Kotecha | H04W 28/0268 |
| 2018/0270703 | A1 * | 9/2018 | Kodali | H04W 28/0252 |
| 2021/0099390 | A1 * | 4/2021 | Thanneeru | H04W 28/0236 |
| 2021/0397475 | A1 * | 12/2021 | Mao | G06F 9/5022 |
| 2022/0191737 | A1 * | 6/2022 | Mindler | H04W 28/0967 |

* cited by examiner

*Primary Examiner* — Romani Ohri
(74) *Attorney, Agent, or Firm* — Blenk Rome LLP

(57) ABSTRACT

Methods, systems, and devices for transmitting credits in a downlink (DL) that include detecting adversity associated with the DL, e.g., network congestion, high CPU loads, thermal threshold of components, etc. In response to the adversity, a policy is determined that includes a number of ranked rules, and the policy is enabled. A baseband (BB) receives an indication of a number of available credits that may be received by an Application Processor (AP), and a number of credits equal to the number of available credits is downloaded based on the policy. The policy may include performing a first pass and a second pass of credit distribution to ensure fairness, while maintaining the respective priority levels of applications serviced in the DL.

20 Claims, 9 Drawing Sheets

METHOD AND APPARATUS FOR DOWNLINK-CREDIT DISTRIBUTION PROTOCOL (DL-CDP) IN WIRELESS COMMUNICATION

FIELD

The present application relates to wireless devices and wireless networks, including systems, devices, circuits, and methods for Downlink-Credit Distribution Protocol (DL-CDP) in Wireless Communication.

BACKGROUND

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS) and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), and BLUETOOTH™, among others.

The ever-increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including the fifth generation (5G) standard and New Radio (NR) communication technologies. Accordingly, improvements in the field in support of such development and design are desired.

Currently, in a downlink (DL), applications are treated equally by the baseband (BB). As a result, critical applications may be penalized under adverse conditions. Also, when setting up a voice call, a User Equipment (UE) exchanges multiple Session Initiation Protocol (SIP) packets with a remote party. If the DL is experiencing adversity, such SIP packets may be delayed, resulting in a longer setup time, or even abortion of the call.

Further, many applications may have time sensitive aspects and, therefore, expect data to arrive in a certain time window. For example, a UE may expect DNS responses or keep alive responses from a server to arrive within a certain time frame. Adversity in the DL may result in applications closing (i.e., giving up) in the absence of the expected DL data. This could lead to a denial of services supplied by an application.

In some circumstances, downloading a large amount of data may affect the operations of applications. That is, downloading a large amount of data could lead to critical applications being starved. For example, Extended Reality (XR)/Virtual Reality (VR) data may be delayed due to a large file download.

Also, it has been observed under adversity that acknowledgements (ACKs) in the Transmission Control Protocol (TCP) may get stuck behind best effort data. This may result in one or more retransmissions, leading to throughput degradation in the transmission of data.

Given the various problems described above, there is a need to prioritize data transmission in the DL under adverse conditions.

SUMMARY

In one aspect, embodiments relate to a method for transmitting credits in a DL that includes detecting adversity associated with the DL. In response to the adversity, a policy is determined that includes a number of ranked rules, and the policy is enabled. A BB receives an indication of a number of available credits that may be received by an Application Processor (AP), and a number of credits equal to the number of available credits is downloaded based on the policy. The policy includes a first pass and a second pass to ensure fairness while maintaining the priority of applications serviced in the DL.

In another aspect, embodiments relate to a UE that includes an AP configured to perform a method. The method includes detecting adversity associated with the DL. In response to the adversity, a policy is determined that includes a number of ranked rules, and the policy is enabled. The UE transmits an indication of a number of available credits that may be received by the AP, and a number of credits equal to the number of available credits is downloaded based on the policy.

In another aspect, embodiments relate to a network device that includes a BB configured to perform a method that includes detecting adversity associated with the DL. In response to the adversity, a policy is determined that includes a number of ranked rules, and the policy is enabled. The BB receives an indication of a number of available credits that may be received by an Application Processor (AP), and a number of credits equal to the number of available credits is downloaded based on the policy.

The techniques described herein may be implemented in and/or used with a number of different types of devices, including but not limited to cellular phones, wireless devices, tablet computers, wearable computing devices, portable media players, Internet of Things (IoT) devices, vehicles, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF DRAWINGS

A better understanding of the present subject matter may be obtained when the following detailed description of various aspects is considered in conjunction with the following drawings.

Figure 1:
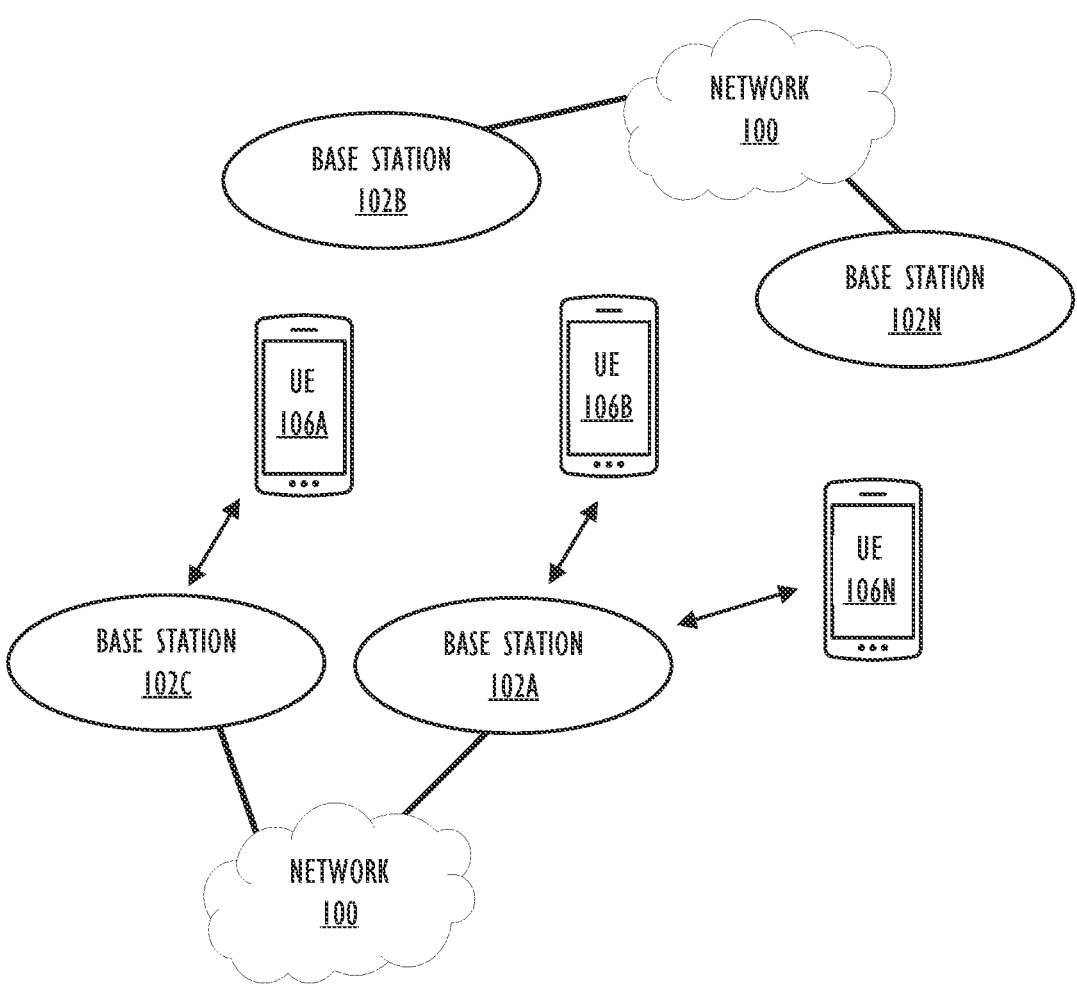
FIG. 1 illustrates an example wireless communication system, according to some aspects.

While the features described herein may be susceptible to various modifications and alternative forms, specific aspects thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

In general, embodiments disclosed herein are directed to systems, devices, circuits, and methods for DL-CDP in Wireless Communication. Embodiments provide for the detection of adversity, and the definition of policy to control and prioritize DL traffic. Embodiments also include the enforcement of the DL credit distribution based on the policy.

In accordance with embodiments, adversity refers to conditions that may adversely impact the download. For example, high CPU loads, memory crunches, back pressure on the network resulting in impairment of critical applications, slow interconnects, thermal threshold of components, and suboptimal physical layer conditions are just some examples that may create adversity.

Embodiments are presented in the context of communication between the Baseband (BB) and an Application Processor (AP) in a wireless network. In this context, a credit refers to a unit of data to be transmitted in the DL, for example a packet, or a number of bytes.

Embodiments disclosed herein may detect adversity in the DL between the AP and the BB by monitoring the DL traffic and/or system health. Embodiments further define a policy for how the DL traffic is routed to the AP. Embodiments also include distributing the DL credits based on the defined policy with fairness.

In embodiments disclosed herein, the rules of the policy may be established based on various measurements and attributes of the network. The policy may also define the order in which the rules should be executed in accordance with embodiments. Embodiments further include the ability to dynamically add, remove, or change policy rules, and the order in which the rules should be executed. In one or more embodiments disclosed herein, the policy may be established/exchanged between the AP and the BB over a data path logical channel for efficient and faster communication.

The following is a glossary of additional terms that may be used in this disclosure:

Memory Medium—Any of various types of non-transitory memory devices or storage devices. The term "memory medium" is intended to include an installation medium, (e.g., a CD-ROM, floppy disks, or tape device: a computer system memory or random-access memory such as DRAM, DDR RAM, SRAM, EDO RAM, Rambus RAM), a non-volatile memory such as a Flash, magnetic media (e.g., a hard drive, or optical storage: registers, or other similar types of memory elements). The memory medium may include other types of non-transitory memory as well or combinations thereof. In addition, the memory medium may be located in a first computer system in which the programs are executed or may be located in a second different computer system which connects to the first computer system over a network, such as the Internet. In the latter instance, the second computer system may provide program instructions to the first computer for execution. The term "memory medium" may include two or more memory mediums which may reside in different locations (e.g., in different computer systems that are connected over a network). The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

User Equipment (UE) (also "User Device," "UE Device," or "Terminal")—any of various types of computer systems or devices that are mobile or portable and that perform wireless communications. Examples of UE devices include mobile telephones or smart phones (e.g., iPhone™, Android™-based phones), portable gaming devices (e.g., Nintendo Switch™, Nintendo DS™, PlayStation Vita™, PlayStation Portable™, Gameboy Advance™, iPhone™), laptops, wearable devices (e.g., smart watch, smart glasses), PDAs, portable Internet devices, music players, data storage devices, other handheld devices, in-vehicle infotainment (IVI), in-car entertainment (ICE) devices, an instrument cluster, head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine type communications (MTC) devices, machine-to-machine (M2M), internet of things (IoT) devices, and the like. In general, the terms "UE" or "UE device" or "terminal" or "user device" may be broadly defined to encompass any electronic, computing, and/or telecommunications device (or combination of devices) that is easily transported by a user (or vehicle) and capable of wireless communication.

Wireless Device—any of various types of computer systems or devices that perform wireless communications. A wireless device may be portable (or mobile) or may be stationary or fixed at a certain location. A UE is an example of a wireless device.

Communication Device—any of various types of computer systems or devices that perform communications, where the communications may be wired or wireless. A communication device may be portable (or mobile) or may be stationary or fixed at a certain location. A wireless device is an example of a communication device. A UE is another example of a communication device.

Base Station—The terms "base station," "wireless base station," or "wireless station" have the full breadth of their ordinary meaning, and at least includes a wireless communication station installed at a fixed location and used to communicate as part of a wireless telephone system or radio system. For example, if the base station is implemented in the context of LTE, it may alternately be referred to as an 'eNodeB' or 'eNB'. If the base station is implemented in the context of 5G NR, it may alternately be referred to as a 'gNodeB' or 'gNB'. Although certain aspects are described in the context of LTE or 5G NR, references to "eNB," "gNB," "nodeB," "base station," "NB," and the like, may refer to one or more wireless nodes that service a cell to provide a wireless connection between user devices and a wider network generally and that the concepts discussed are not limited to any particular wireless technology. Although certain aspects are described in the context of LTE or 5G NR, references to "eNB," "gNB," "nodeB," "base station," "NB," and the like, are not intended to limit the concepts discussed herein to any particular wireless technology and the concepts discussed may be applied in any wireless system.

Node—The term "node," or "wireless node" as used herein, may refer to one more apparatus associated with a cell that provide a wireless connection between user devices and a wired network generally.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an Application Specific Integrated Circuit (ASIC), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, and the like). For example, LTE may support scalable channel bandwidths from 1.4 MHz to 20 MHz. WLAN channels may be 22 MHz wide while Bluetooth channels may be 1 Mhz wide. Other protocols and standards may include different definitions of channels. Furthermore, some standards may define and use multiple types of channels (e.g., different channels for uplink or downlink and/or different channels for different uses such as data, control information, and the like).

Band—The term "band" has the full breadth of its ordinary meaning, and at least includes a section of spectrum (e.g., radio frequency spectrum) in which channels are used or set aside for the same purpose.

Configured to—Various components may be described as "configured to" perform a task or tasks. In such contexts, "configured to" is a broad recitation generally meaning "having structure that" performs the task or tasks during operation. As such, the component may be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component may be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Example Wireless Communication System

Turning now to FIG. 1, a simplified example of a wireless communication system is illustrated, according to some aspects. It is noted that the system of FIG. 1 is a non-limiting example of a possible system, and that features of this disclosure may be implemented in any of various systems, as desired.

As shown, the example wireless communication system includes a base station 102A, which communicates over a transmission medium with one or more user devices 106A and 106B, through 106N. Each of the user devices may be referred to herein as a "user equipment" (UE). Thus, the user devices 106 are referred to as UEs or UE devices.

The base station (BS) 102A may be a base transceiver station (BTS) or cell site (e.g., a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-A, 5G NR, HSPA, 3GPP2 CDMA2000. Note that if the base station 102A is implemented in the context of LTE, it may alternately be referred to as an 'eNodeB' or 'eNB'. Note that if the base station 102A is implemented in the context of 5G NR, it may alternately be referred to as a 'gNodeB' or 'gNB'.

In some aspects, the UEs 106 may be IoT UEs, which may comprise a network access layer designed for low-power IoT applications utilizing short-lived UE connections. An IoT UE may utilize technologies such as M2M or MTC for exchanging data with an MTC server or device via a public land mobile network (PLMN), proximity service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. As an example, vehicles to everything (V2X) may utilize ProSe features using a side link (SL) interface for direct communications between devices. The IoT UEs may also execute background applications (e.g., keep-alive messages, status updates, and the like) to facilitate the connections of the IoT network.

In V2X scenarios, one or more of the base stations 102 may be or act as Road Side Units (RSUs). The term RSU may refer to any transportation infrastructure entity used for V2X communications. An RSU may be implemented in or by a suitable wireless node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/software to sense and control ongoing vehicular and pedestrian traffic. The RSU may operate on the 5.9 GHZ Intelligent Transport Systems (ITS) band to provide very low latency communications required for high-speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi hotspot (2.4 GHz band) and/or provide connectivity to one or more cellular networks to provide uplink and downlink communications. The computing device(s) and some or all of the radio frequency circuitry of the RSU may be packaged in a weather enclosure suitable for outdoor installation, and it may include a network interface controller to provide a wired connection (e.g., Ethernet) to a traffic signal controller and/or a backhaul network.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B through 102N) operating according to the same or a different cellular communication standard may thus be provided as a network of cells, which may provide continuous or nearly continuous overlapping service to UEs 106A-106N and similar devices over a geographic area via one or more cellular communication standards.

Thus, while base station 102A may act as a "serving cell" for UEs 106A-106N as illustrated in FIG. 1, each UE 106 may also be capable of receiving signals from (and possibly within communication range of) one or more other cells (which may be provided by base stations 102B-102N and/or any other base stations), which may be referred to as "neighboring cells." Such cells may also be capable of facilitating communication between user devices and/or between user devices and the network 100. Such cells may include "macro" cells, "micro" cells, "pico" cells, and/or cells which provide any of various other granularities of service area size. For example, base stations 102A and 102B illustrated in FIG. 1 may be macro cells, while base station 102N may be a micro cell. Other configurations are also possible.

In some aspects, base station 102A may be a next generation base station, (e.g., a 5G New Radio (5G NR) base station, or "gNB"). In some aspects, a gNB may be connected to a legacy evolved packet core (EPC) network and/or to a NR core (NRC)/5G core (5GC) network. In addition, a gNB cell may include one or more TRPs. In addition, a UE capable of operating according to 5G NR may be connected to one or more TRPs within one or more gNBs. For example, it may be possible that that the base station 102A and one or more other base stations 102 support joint transmission, such that UE 106 may be able to receive transmissions from multiple base stations (and/or multiple TRPs provided by the same base station). For example, as illustrated in FIG. 1, both base station 102A and base station 102C are shown as serving UE 106A.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, and the like) in addition to at least one of the cellular communication protocol discussed in the definitions above. The UE 106 may also or alternatively be configured to communicate using one or more global navigational satellite systems (GNSS) (e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

In one or more embodiments, the UE 106 may be a device with cellular communication capability such as a mobile phone, a hand-held device, a computer, a laptop, a tablet, a smart watch, or other wearable device, or virtually any type of wireless device. Embodiments may also include vehicles, industrial equipment, or other devices that may benefit from multi-panel wireless connectivity.

The UE 106 may include a processor (processing element) that is configured to execute program instructions stored in memory. The UE 106 may perform any of the method aspects described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method aspects described herein, or any portion of any of the method aspects described herein.

The UE 106 may include one or more antennas for communicating using one or more wireless communication protocols or technologies. In some aspects, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for a multiple-input multiple output (MIMO) configuration) for performing wireless communications. In general, a radio may include any combination of a BB processor, analog RF signal processing circuitry (e.g., including filters, mixers, oscillators, amplifiers, and the like), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some aspects, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

In some aspects, a downlink resource grid may be used for downlink transmissions from any of the base stations 102 to the UEs 106, while uplink transmissions may utilize similar techniques. The grid may be a time-frequency grid, called a resource grid or time-frequency resource grid, which is the physical resource in the downlink in each slot. Such a time-frequency plane representation is a common practice for Orthogonal Frequency Division Multiplexing (OFDM) systems, which makes it intuitive for radio resource selection. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid may comprise a number of resource blocks, which describe the mapping of certain physical channels to resource elements. Each resource block comprises a collection of resource elements. There are several different physical downlink channels that are conveyed using such resource blocks.

The physical downlink shared channel (PDSCH) may carry user data and higher layer signaling to the UEs 106. The physical downlink control channel (PDCCH) may carry information about the transport format and resource allocations related to the PDSCH channel, among other things. It may also inform the UEs 106 about the transport format, resource allocation, and HARQ (Hybrid Automatic Repeat Request) information related to the uplink shared channel. Typically, downlink scheduling (assigning control and shared channel resource blocks to the UE 102 within a cell) may be performed at any of the base stations 102 based on channel quality information fed back from any of the UEs 106. The downlink resource assignment information may be sent on the PDCCH used for (e.g., assigned to) each of the UEs.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH may be transmitted using one or more CCEs, depending on the size of the Downlink Control Information (DCI) and the channel condition. There may be four or more different PDCCH formats defined in LTE with different numbers of CCEs (e.g., aggregation level, L=1, 2, 4, or 8).

Example Communication Device

Figure 2:
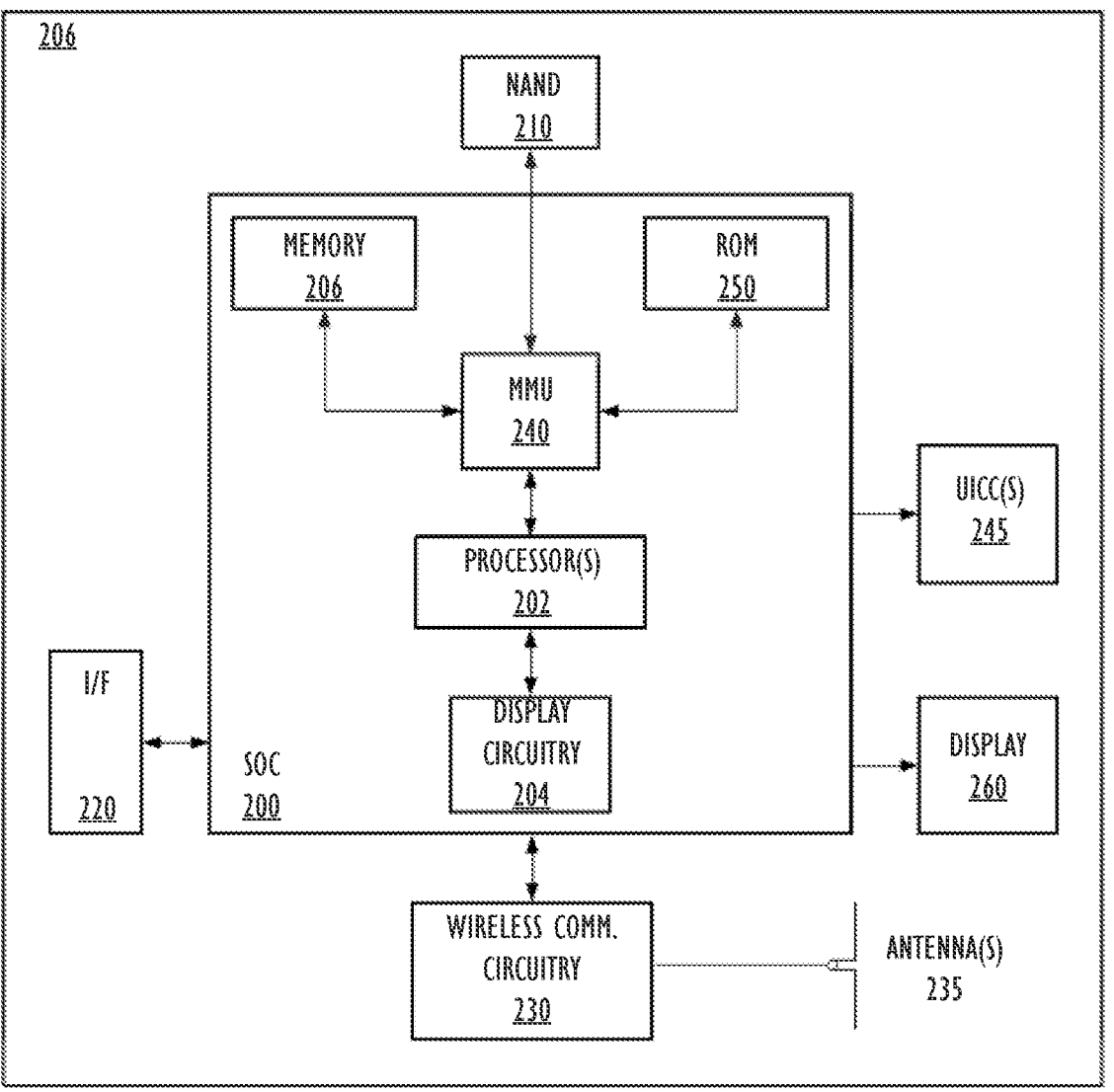
FIG. 2 illustrates a communication device, according to some aspects.

FIG. 2 illustrates an example simplified block diagram of a communication device 206, according to some aspects. It is noted that the block diagram of the communication device of FIG. 2 is only one example of a possible communication device. According to aspects, communication device 206 may be a UE device or terminal, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 206 may include a set of components 200 configured to perform core functions. For example, this set of components may be implemented as a system on chip (SOC), which may include portions for various purposes. Alternatively, this set of components 200 may be implemented as separate components or groups of components for the various purposes. The set of components 200 may be coupled (e.g., communicatively: directly or indirectly) to various other circuits of the communication device 206.

For example, the communication device 206 may include various types of memory (e.g., including NAND flash 210), an input/output interface such as connector I/F 220 (e.g., for connecting to a computer system; dock: charging station; input devices, such as a microphone, camera, keyboard: output devices, such as speakers; and the like), the display 260, which may be integrated with or external to the communication device 206, and wireless communication circuitry 230 (e.g., for LTE, LTE-A, NR, UMTS, GSM, CDMA2000, Bluetooth, Wi-Fi, NFC, GPS, and the like). In some aspects, communication device 206 may include wired communication circuitry (not shown), such as a network interface card (e.g., for Ethernet connection).

The wireless communication circuitry 230 may couple (e.g., communicatively: directly or indirectly) to one or more antennas, such as antenna(s) 235 as shown. The wireless communication circuitry 230 may include cellular communication circuitry and/or short to medium range wireless communication circuitry, and may include multiple receive chains and/or multiple transmit chains for receiving and/or transmitting multiple spatial streams, such as in a MIMO configuration.

In some aspects, as further described below, cellular communication circuitry 230 may include one or more receive chains (including and/or coupled to (e.g., communicatively: directly or indirectly) dedicated processors and/ or radios) for multiple Radio Access Technologies (RATs) (e.g., a first receive chain for LTE and a second receive chain for 5G NR). In addition, in some aspects, cellular communication circuitry 230 may include a single transmit chain that may be switched between radios dedicated to specific RATs. For example, a first radio may be dedicated to a first RAT (e.g., LTE) and may be in communication with a dedicated receive chain and a transmit chain shared with a second radio. The second radio may be dedicated to a second RAT (e.g., 5G NR) and may be in communication with a dedicated receive chain and the shared transmit chain. In some aspects, the second RAT may operate at mmWave frequencies. As mmWave systems operate in higher frequencies than typically found in LTE systems, signals in the mmWave frequency range are heavily attenuated by environmental factors. To help address this attenuating, mmWave systems often utilize beamforming and include more antennas as compared LTE systems. These antennas may be organized into antenna arrays or panels made up of individual antenna elements. These antenna arrays may be coupled to the radio chains.

The communication device 206 may also include and/or be configured for use with one or more user interface elements. The communication device 206 may further include one or more smart cards 245 that include Subscriber Identity Module (SIM) functionality, such as one or more Universal Integrated Circuit Card(s) (UICC(s)) cards 245.

As shown, the SOC 200 may include processor(s) 202, which may execute program instructions for the communication device 106 and display circuitry 204, which may perform graphics processing and provide display signals to the display 260. The processor(s) 202 may also be coupled to memory management unit (MMU) 240, which may be configured to receive addresses from the processor(s) 202 and translate those addresses to locations in memory (e.g., memory 206, read only memory (ROM) 250, NAND flash memory 210) and/or to other circuits or devices, such as the display circuitry 204, wireless communication circuitry 230, connector I/F 220, and/or display 260. The MMU 240 may be configured to perform memory protection and page table translation or set up. In some aspects, the MMU 240 may be included as a portion of the processor(s) 202.

As noted above, the communication device 206 may be configured to communicate using wireless and/or wired communication circuitry. As described herein, the communication device 206 may include hardware and software components for implementing any of the various features and techniques described herein. The processor 202 of the communication device 206 may be configured to implement part or all of the features described herein (e.g., by executing program instructions stored on a memory medium). Alternatively (or in addition), processor 202 may be configured as a programmable hardware element, such as a Field Programmable Gate Array (FPGA), or as an Application Specific Integrated Circuit (ASIC). Alternatively (or in addition) the processor 202 of the communication device 206, in conjunction with one or more of the other components 200, 204, 206, 210, 220, 230, 240, 245, 250, 260 may be configured to implement part or all of the features described herein.

In addition, as described herein, processor 202 may include one or more processing elements. Thus, processor 202 may include one or more integrated circuits (ICs) that are configured to perform the functions of processor 202. In addition, each integrated circuit may include circuitry (e.g., first circuitry, second circuitry, and the like) configured to perform the functions of processor(s) 202.

Further, as described herein, wireless communication circuitry 230 may include one or more processing elements. In other words, one or more processing elements may be included in wireless communication circuitry 230. Thus, wireless communication circuitry 230 may include one or more integrated circuits (ICs) that are configured to perform the functions of wireless communication circuitry 230. In addition, each integrated circuit may include circuitry (e.g., first circuitry, second circuitry, and the like) configured to perform the functions of wireless communication circuitry 230.

Example Base Station

Figure 3:
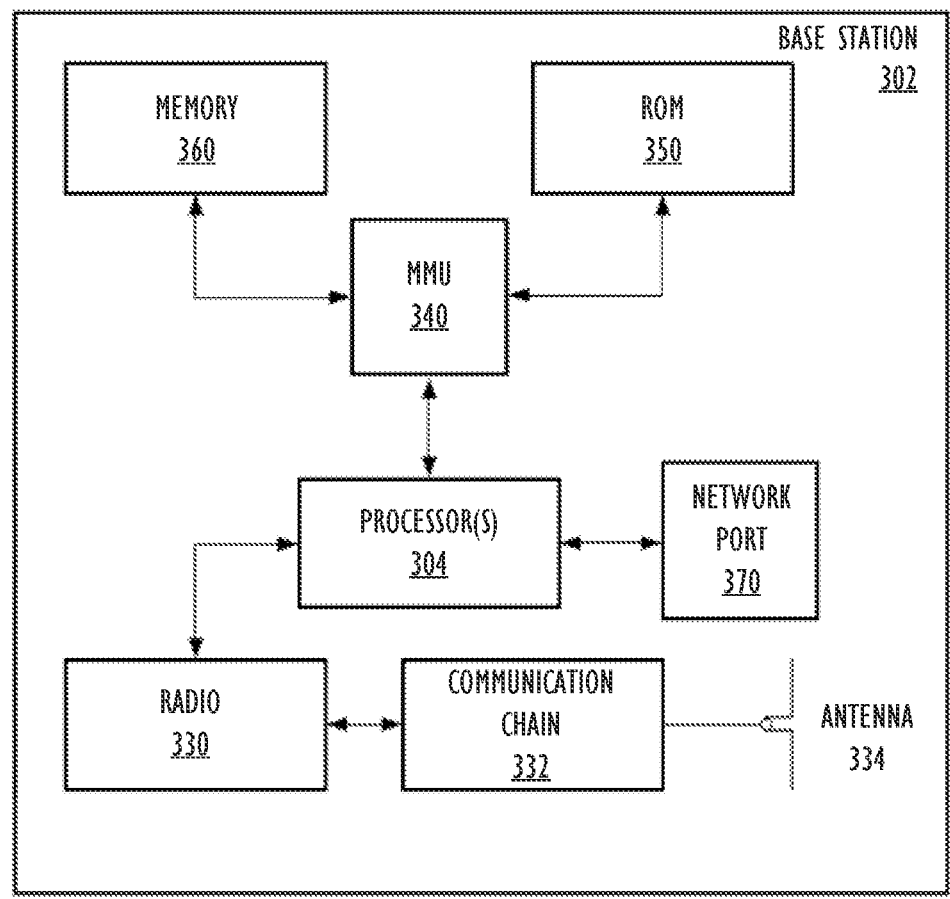
FIG. 3 illustrates an example block diagram of a Base Station (BS), according to some aspects.

FIG. 3 illustrates an example block diagram of a base station 302, according to some aspects. It is noted that the base station of FIG. 3 is a non-limiting example of a possible base station. As shown, the base station 302 may include processor(s) 304 which may execute program instructions for the base station 302. The processor(s) 304 may also be coupled to memory management unit (MMU) 340, which may be configured to receive addresses from the processor (s) 304 and translate those addresses to locations in memory (e.g., memory 360 and read only memory (ROM) 350) or to other circuits or devices.

The base station 302 may include at least one network port 370. The network port 370 may be configured to couple to a telephone network and provide a plurality of devices, such as UE devices 106, access to the telephone network as described above in FIG. 1.

The network port 370 (or an additional network port) may also or alternatively be configured to couple to a cellular network, e.g., a core network of a cellular service provider. The core network may provide mobility related services and/or other services to a plurality of devices, such as UE devices 106. In some cases, the network port 370 may couple to a telephone network via the core network, and/or the core network may provide a telephone network (e.g., among other UE devices serviced by the cellular service provider).

In some aspects, base station 302 may be a next generation base station, (e.g., a 5G New Radio (5G NR) base station, or "gNB"). In such aspects, base station 302 may be connected to a legacy evolved packet core (EPC) network and/or to a NR core (NRC)/5G core (5GC) network. In addition, base station 302 may be considered a 5G NR cell and may include one or more transition and reception points (TRPs). In addition, a UE capable of operating according to 5G NR may be connected to one or more TRPs within one or more gNBs.

The base station 302 may include at least one antenna 334, and possibly multiple antennas. The at least one antenna 334 may be configured to operate as a wireless transceiver and may be further configured to communicate with UE devices 106 via radio 330. The antenna 334 communicates with the radio 330 via communication chain 332. Communication chain 332 may be a receive chain, a transmit chain or both. The radio 330 may be configured to communicate via various wireless communication standards, including 5G NR, LTE, LTE-A, GSM, UMTS, CDMA2000, Wi-Fi, and the like.

The base station 302 may be configured to communicate wirelessly using multiple wireless communication standards. In some instances, the base station 302 may include multiple radios, which may enable the base station 302 to communicate according to multiple wireless communication technologies. For example, as one possibility, the base station 302 may include an LTE radio for performing communication according to LTE as well as a 5G NR radio for performing communication according to 5G NR. In such a case, the base station 302 may be capable of operating as both an LTE base station and a 5G NR base station. When the base station 302 supports mmWave, the 5G NR radio may be coupled to one or more mmWave antenna arrays or panels. As another possibility, the base station 302 may include a multi-mode radio, which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, and the like).

Further, the BS 302 may include hardware and software components for implementing or supporting implementation of features described herein. The processor 304 of the base station 302 may be configured to implement or support implementation of part or all of the methods described herein (e.g., by executing program instructions stored on a memory medium). Alternatively, the processor 304 may be configured as a programmable hardware element, such as a Field Programmable Gate Array (FPGA), or as an Application Specific Integrated Circuit (ASIC), or a combination thereof. Alternatively (or in addition) the processor 304 of the BS 302, in conjunction with one or more of the other components 330, 332, 334, 340, 350, 360, 370 may be configured to implement or support implementation of part or all of the features described herein.

In addition, as described herein, processor(s) 304 may include one or more processing elements. Thus, processor(s) 304 may include one or more integrated circuits (ICs) that are configured to perform the functions of processor(s) 304. In addition, each integrated circuit may include circuitry (e.g., first circuitry, second circuitry, and the like) configured to perform the functions of processor(s) 304.

Further, as described herein, radio 330 may include one or more processing elements. Thus, radio 330 may include one or more integrated circuits (ICs) that are configured to perform the functions of radio 330. In addition, each integrated circuit may include circuitry (e.g., first circuitry, second circuitry, and the like) configured to perform the functions of radio 330.

Figure 4:
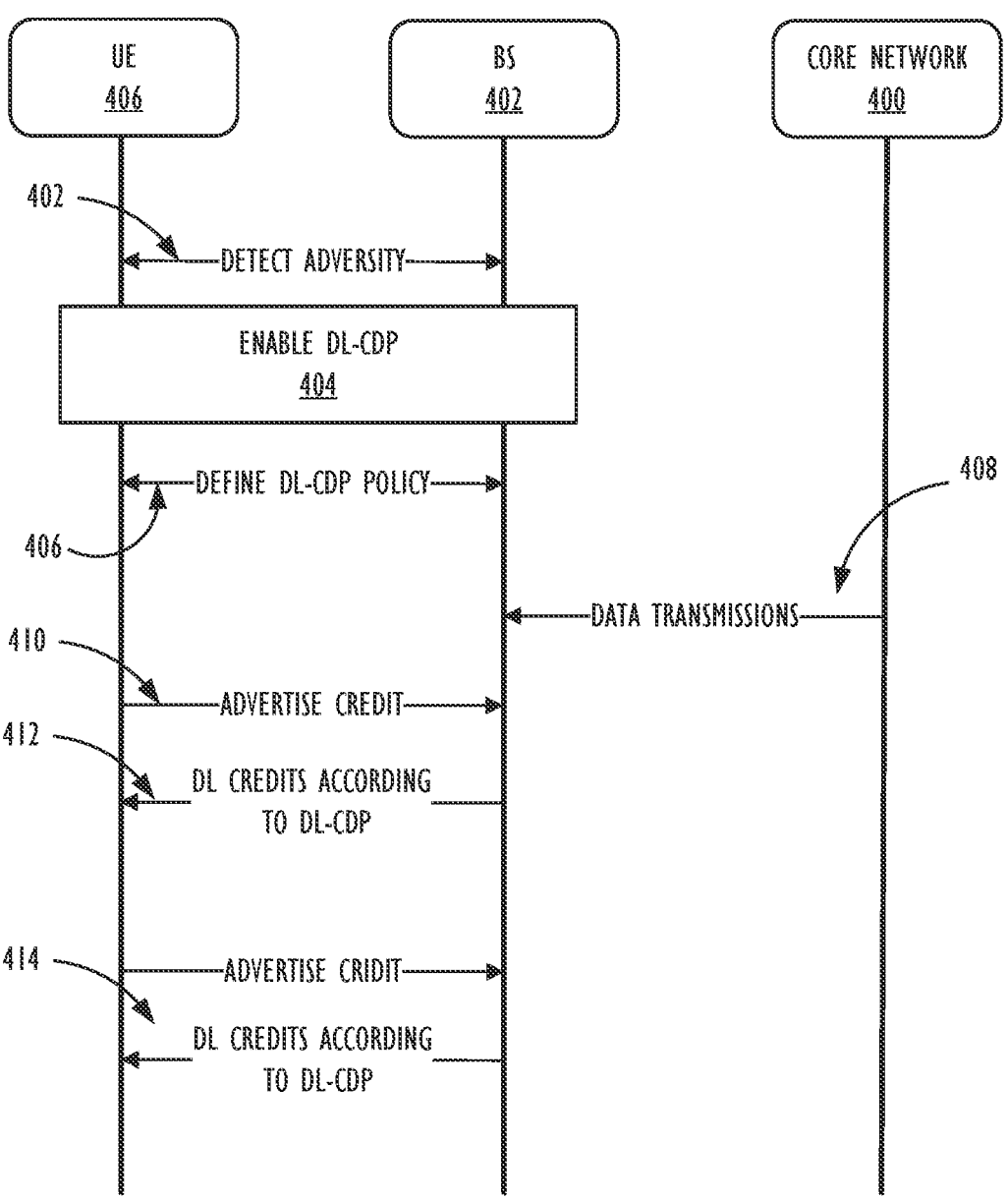
FIG. 4 illustrates communication in a system, in accordance with some aspects.

FIG. 4 illustrates communication in a system, in accordance with some aspects. In the examples of FIG. 4, a UE 406 includes an AP and the BS 402 includes a BB. At step 402, adversity is detected in the DL from the BS to the UE. The adversity may be detected by the AP in the UE, or by the BB in the BS, or by both in combination. For example, DL data delivery to end applications may be monitored. More specifically, the data delivery relative to an application priority may be monitored. Also, DL stress in the form of an amount of pending data in a DL queue may be monitored.

In addition, the system health may be monitored to detect adversity in the DL. For example, a high CPU load utilization factor on the AP, i.e., CPU throttling, may be an indication of adversity in the DL. A memory crunch in the AP or the BB may also be an indication of adversity in accordance with embodiments disclosed herein.

A slow drain of data from the application can result in back pressure on the BB/BS. For example, a critical application, such as XR/VR or TCP ACK, may get stuck behind best effort data. Also, a slow interconnect between the AP/UE and the BB/BS may develop as a result of such adversities to the health of the system.

The thermal threshold of components in the UE and BS may be monitored to detect adversity in accordance with embodiments disclosed herein. A component approaching, or reaching, a thermal threshold can be indicative of adversity in a DL.

A suboptimal physical layer condition can result in bursts of data that may adversely affect the DL. For example, the expiration of a Package Data Convergence Protocol (PDCP) reordering timer may result in a suboptimal physical layer, leading to bursts of data.

Returning to FIG. 4, DL-CDP is enabled in step 404 in response to the detection of the adversity at step 402. The enablement of the DL-CDP may be instigated by the UE or the BS in accordance with embodiments disclosed herein. Enabling the DL-CDP includes establishing the DL-CDP policy for the DL based on the adversity detected. In accordance with embodiments disclosed herein, the policy may be static or dynamic depending on the detected adversity and current conditions.

The policy is defined and established in step 406. In embodiments disclosed herein, the rules in the policy may be defined based on various measurements and attributes of the system. The policy also establishes the order in which the rules should be executed. Embodiments disclosed herein may dynamically add/remove/change policy rules and their associated order in order to perform the DL-CDP. In embodiments, the policy may be exchanged over a data path logical channel for faster, efficient communication.

Examples of policy attributes include, but are not limited to, an application criticality or category. Examples of such categories include voice applications, low latency applications, Best Effort applications, Keep Alive applications, Streaming applications, etc. Voice applications are applications that include voice communications, such as video conferencing, Voice over New Radio (VoNR), and Voice over Long Term Evolution (VOLTE). Low latency applications are applications that may require low latency in the transmissions, such as XR/VR. Examples of best effort applications may include media streaming or other Internet-based applications.

Other attributes that may be used to establish the policy include flow aspects in accordance with embodiments disclosed herein. For example, flow aging, average time in DL queue, flow throughput, and flow periodicity may be used. For example, flow aging aspects may include new flows, old flows, or short lived flows-such as flows associated with gaming consoles or internet speed test applications. The flow throughput may be established by determining how much data is received over a period of time. For example, a flow throughput may be defined as the amount of data received in the previous 100 ms. The flow periodicity aspects include the periodic sending/receiving of data and/or continues in data streaming. Flow discards, or flows associated with relatively large applications may also be included.

Other attributes include the sizes of the packets transmitted in accordance with embodiments disclosed herein. For example, small packets, such as a PING, as compared to larger IP packets, such as in FTP.

The Layer 4 protocol type communication attributes may also contribute to the policy in accordance with embodiments. For example, aspects of the TCP ACKs, DNS response, PING response, and User Datagram Protocol (UDP) communication may be included in establishing the policy. The Differentiated Services Codepoint (DSCP) or Type of Service (ToS) in the layer 2 header may also contribute to the policy in accordance with embodiments disclosed herein.

The Protocol Data Unit (PDU) secessions established in the Packet Data Network (PDN), Data Radio Bearer (DRB) and the flows associated with DRBs, Ultra-Reliable Low Latency Communication (URLLC) slices, IP Multimedia Subsystem (IMS) signaling bearers, IMS media bearers, current internet traffic, and Admin PDUs may also be considered while establishing a policy in accordance with embodiments disclosed herein.

In embodiments disclosed herein, the policy establishment may include defining new attributes and rules based the DL patterns observed. The DL-CDP policy is dynamic in nature, and the policy may included more, or less, rules based on downlink pattern.

The following provides several examples of policies that may be established in accordance with embodiments disclosed herein. The examples are provide to illustrate the various possibilities, and the examples are not intended to be limiting.

For example, the UE and BS may define a simple policy based on the application criticality, or a category based policy. The policy is defined by a number of ranked rules. In this example, five tuples have been identified to categorize the applications and ranked according to priority. The policy may then be defined as: Rule 1: XR/VR Application: Rule 2: videoconferencing or voice application; Rule 3: intelligent assistant/AI-based application: Rule 4: streaming application; and Rule 5: remaining application. This categorized ranking provides a policy that may be used to implement the DL-CDP in accordance with embodiments disclosed herein. If one or more applications are set up, the system may dynamically add one or more rules based on the new applications.

As another simple example, the system may monitor DL patterns and define a time critically and throughput policy. For example, the policy may be defined as: Rule 1: new flows; Rule 2: short lived flows: Rule 3: minimum average time spent in DL queue: Rule 4: small packets; and Rule 5: remaining applications. In some embodiments, the system may dynamically add or remove rules based on a new DL pattern detected.

As another simple example, the system may establish a static policy. For example, the policy may then be defined as: Rule 1: URLLC slice: Rule 2: IMS bearers: Rule 3: TCP pure ACKs; Rule 4: DNS response: Rule 5: PING response: and Rule 6: remaining applications.

As another example, the system may establish a policy based on both the application criticality and the time criticality. For example, the policy may be defined as: Rule 1: XR/VR application with relatively small packets; Rule 2: Video conferencing application on Internet PDN: Rule 3: internet speed test application and no voice call: Rule 4: new TCP flow application and pure ACKs; and Rule 5: discard remaining packets.

As previously noted, the policy may be dynamically altered in accordance with embodiments disclosed herein. For example, an initial policy may be established as: Rule 1: XR/VR applications; Rule 2: IMS PDU traffic: Rule 3: music stream application; and Rule 4: rest all application. While this policy is established, a user may start an application, such as an Intelligent Assistant. Embodiments of the UE (or AP) may dynamically modify the policy to replace the IMS PDU rule (Rule 2) with Intelligent Assistant application traffic. As a result, the new policy would be: Rule 1: XR/VR application: Rule 2: Intelligent Assistant Application Traffic: Rule 3: music stream application; and Rule 4: rest all application.

Returning to FIG. 4, after the policy has been defined in step 406, the DL-CDP policy is enforced for data destined to the UE from the network. Specifically, data transmissions are received by the BS from the core network in step 408. The DL-CDP includes the UE, or AP of the UE, advertising a number of available credits for the DL in step 410. In step 412, the BS transmits data in the DL according to the advertised number of credits and the policy established. Further details regarding the transmission of credits in the DL according to the DL-CDP is given in FIGS. 5A and 5B. As shown in step 414, the advertising of credit, followed by the transmission of credits according to the DL-CDP and advertisement may be repeated. Step 414 may be continuously repeated until the policy changes, or the adversity subsides.

Embodiments disclosed herein intelligently distribute credits among rules defined in policy using the limited credits advertised. Embodiments of the BS, or BB, distribute the credits in the methods disclosed herein to ensure fairness and avoid starvation of low priority traffic. In general, the BS assigns a minimum credit to each rule in the policy, and the remaining credits are assigned to rules in the order the rules were defined.

More specifically, embodiments disclosed herein use a DL credit distribution algorithm that includes a two-pass approach to consume the number of available credits advertised. Embodiments of the first pass are demonstrated in FIG. 5A, while embodiments of the second pass are demonstrated in FIG. 5B.

Figure 5A:
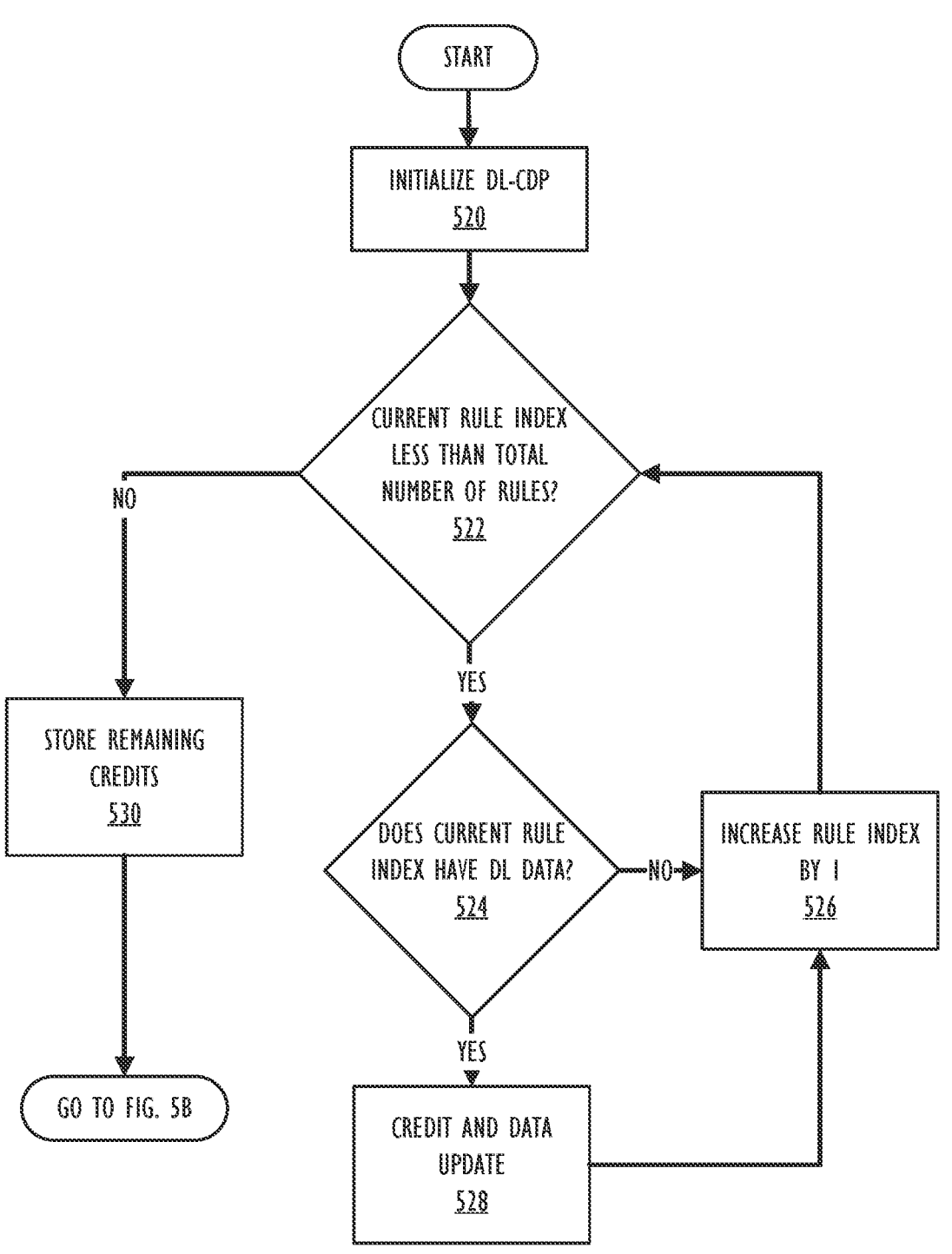
FIGS. 5A and 5B illustrate flow charts for DL-CDP, according to some aspects.

Referring to FIG. 5A, the DL-CDP is initialized in step 520. In step 520, a minimum number of credits for the first pass is determined. For example, half of the available credits may be allocated to the first pass. A minimum DL credit percentage per rule may be defined as half the total number of credits per the number of rules in the policy, i.e., Min. DL credit % per rule=((Total number of credits/2)/Number of rules in the policy. This establishes the number of credits available for the first pass in accordance with embodiments disclosed herein. Embodiments disclosed herein are not limited to using 50% of the available credits in the first pass. As explained below, any credits not used in the first pass will be available for the second pass. However, to ensure fairness, the number of credits used for the first pass ideally allows for using a minimum credit for all the rules in the policy.

The process then proceeds to assign the minimum number of credits to each rule in the order of the rule index (i.e., the priority). Specifically, in step 522, it is determined if the current rule index is less than the total number of rules. If so (YES), it is determined if there is any DL data associated with the current rule. If there is DL data associated with the current rule, the data is to be downloaded, and the number of credits for the data download is recorded in step 528. The current rule index is then increased by one in step 526, and the process returns to step 522. If there is no DL data associated with the current rule index (NO in step 524), the current rule index is increased by one and the process returns to step 522. Once all the rules have been traversed (NO in step 522), any remaining credits from the determined number of credits for the first pass are stored, or allocated, to the second pass in step 530. Step 530 may include determining the number of credits that have been consumed in the first pass.

Figure 5B:
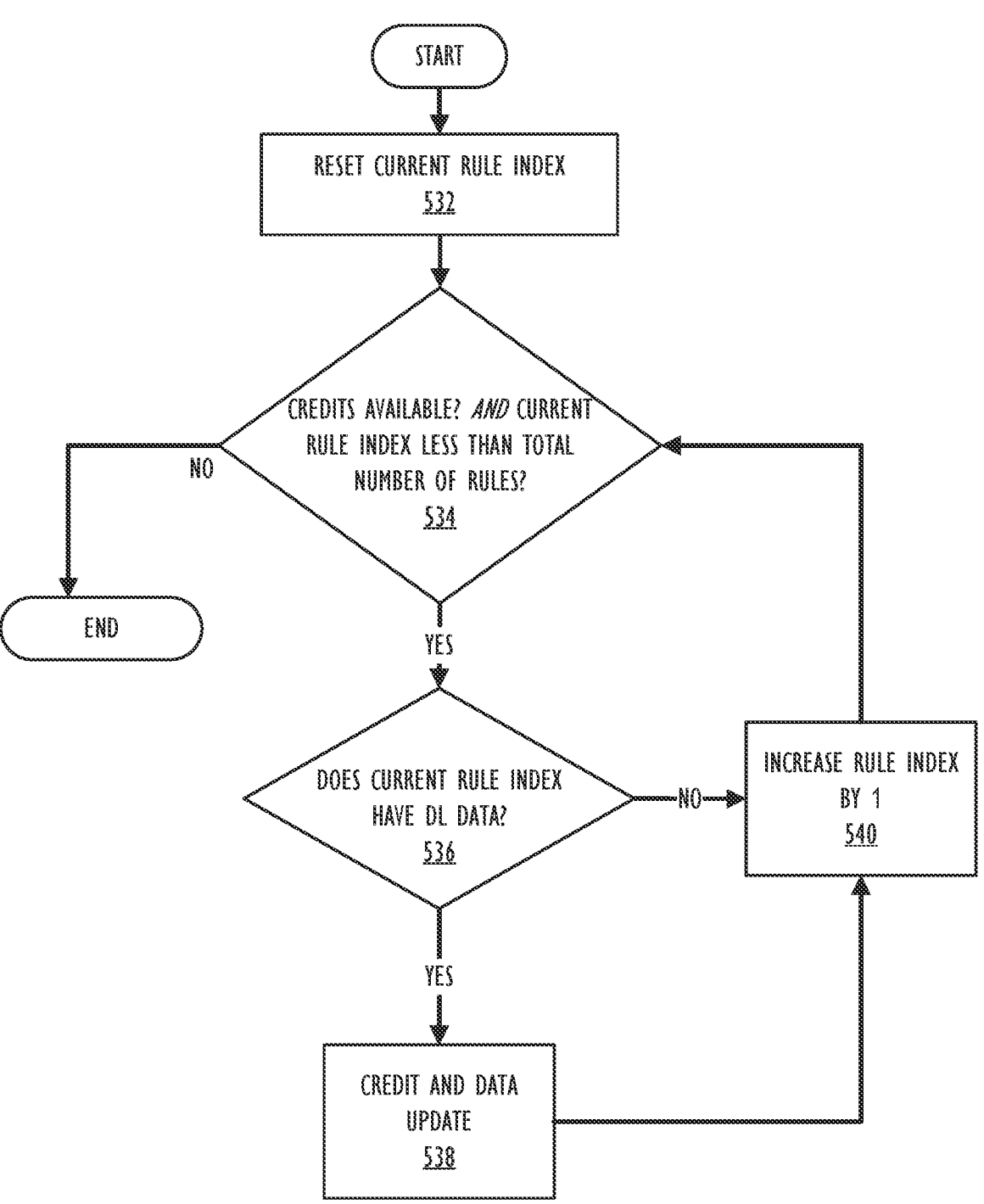

After the conclusion of Step 530, the process may proceed to FIG. 5B, which illustrates a second pass according to some aspects. The second pass may be considered a greedy approach to the consumption of credits while still honoring the priority of the rules in the policy. In step 532 of FIG. 5B, the current rule index is reset to the highest priority rule for the second pass. In step 534, it is determined if the current rule index is less than the total number of rules (i.e., if all the rules been considered) and if there are any credits available for the DL of data.

If both of the conditions are met in step 534 (YES), it is determined if the current rule identified by the rule index has data to download in step 536. If so (YES), the data is set for downloaded in step 538. At this step, the process greedily assigns the available credits to the current rule. That is, all the data/credits associated with the rule are set for download, as restricted by the number of available credits. The process proceeds to step 540 where the rule index is increase by 1 and, then, the process returns to step 534.

If there is no data associated with the current rule index (NO in step 536), the process proceeds to step 540 where the current rule index is incremented, and the process returns to step 534.

If the available credits have been consumed, or if all of the rules have been considered (NO in step 534), the process ends.

As noted, the second pass starts at the highest priority rule, and tries to use as many credits as possible for said rule, and then proceeds to the next rule in the prioritized list. That is, once all data for a particular higher priority rule is completely sent, and there are still credits pending, the algorithm jumps to next rule and repeats the process until all of the available credits are consumed. In the circumstance that there are residual credits available after the second pass, such credits will not be used.

Figure 6:
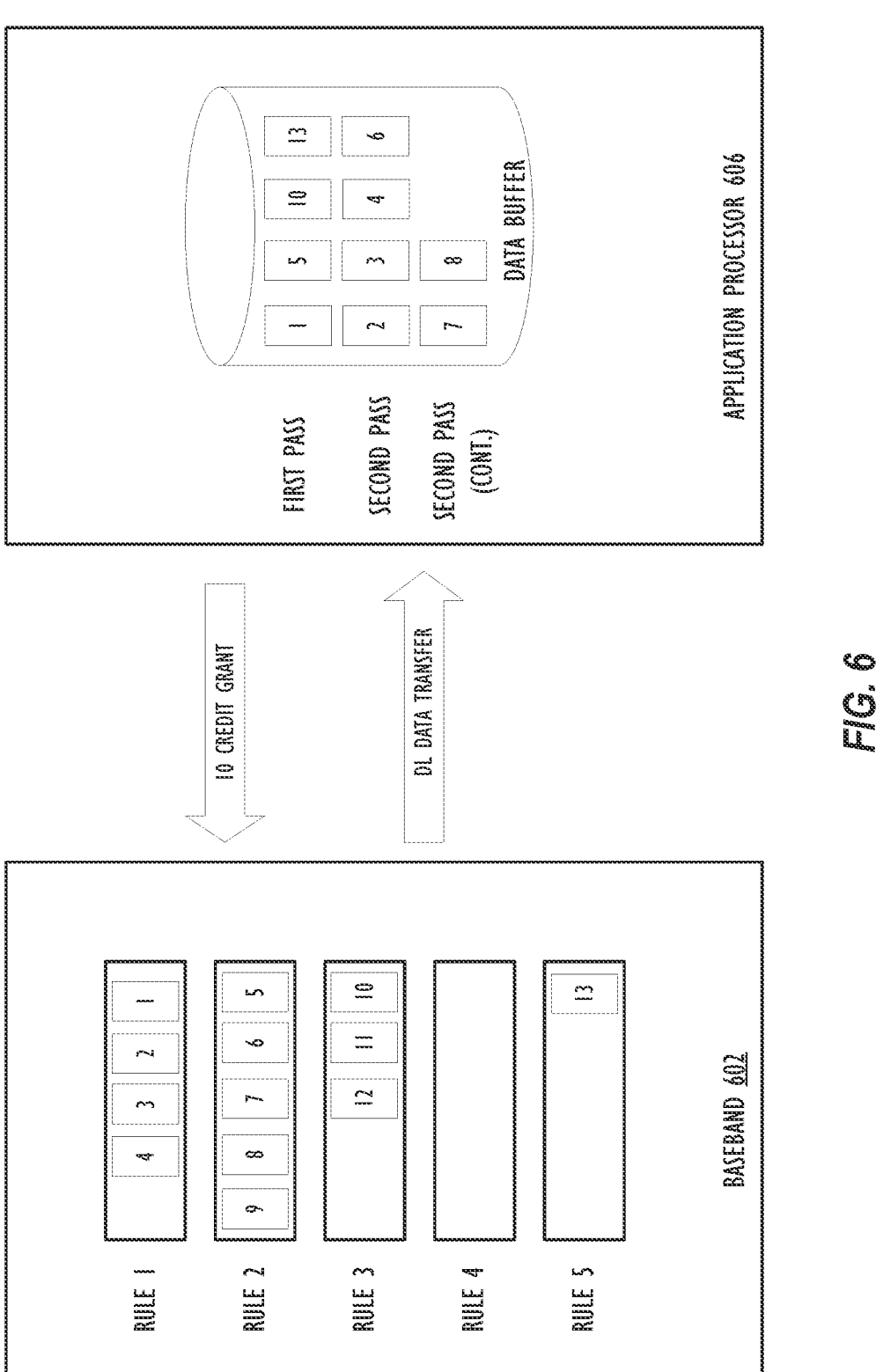
FIG. 6 illustrates an example of a DL-CDP process, according to some aspects.

FIG. 6 provides an example in accordance with embodiments disclosed herein. FIG. 6 illustrates an example of the DL-CDP described by FIGS. 4, 5A, and 5B. FIG. 6 illustrates a Baseband 602 showing five ranked rules in accordance with the DL-CDP disclosed herein. There are 13 credits to be transmitted on the DL to the Application processor 606 in the example of FIG. 6. Each of the 13 credits is associated with a rule as shown. As previously noted, in this context, one credit may refer to one packet, or one or more number of bytes.

In FIG. 6, a 10 credit grant is relayed to the baseband 602. As shown, in the first pass, a credit from each of the rules is picked and transmitted to the data buffer of the application processor 606. Specifically, credits 1, 5, 10, and 13 are transmitted via the first pass. Note that Rule 4 does not have any traffic, so no credit is used. Further, the credit that would be used for Rule 4 is now available for the second pass.

In accordance with embodiments disclosed herein, the second pass starts at Rule 1, and the credits are used in greedy manner until all of the available credits are consumed. Thus, credits 2, 3, and 4 are set for transmission. The process moves to Rule 2, where credits 6, 7, 8 are set for transmission. Given that 10 credits were advertised, the process runs out of credits after credit 8 is set.

FIGS. 7A, 7B, 7C, and 7D illustrate another example in accordance with embodiments disclosed herein. For the process described in the totality of FIG. 7, a simple policy is defined to prioritize videoconferencing application data in accordance with embodiments disclosed herein. Specifically, the policy is defined as: Rule 1: IMS Signal bearer traffic: Rule 2: IMS Media bearers; and Rule 3: remaining applications.

As shown in FIG. 7, the baseband 702 includes a baseband driver 775 and a Layer 3 packet dispatcher 777. The baseband driver 775 and Layer 3 packet dispatcher 777 facilitate the transfer of credits (shown as shaded blocks) to the application processor 706 via the interconnect 779. The baseband 702 also includes three DRB pipes with each pipe containing three credits to be transferred to applications in the application processor 706.

In FIG. 7, two PDNs, the internet PDN 781 and the IMS PDN 783 are established in the baseband 702. The internet PDN 781 includes DRB pipe 1 for sending internet packets. The IMS PDN 783 includes DRB pipe 2 as a default bearer for SIP signaling and DRB pipe 3 as a dedicated bearer, such as for Real-time Transport Protocol (RTP)/RTP Control Protocol (RTCP).

Figures 7A, 7B:
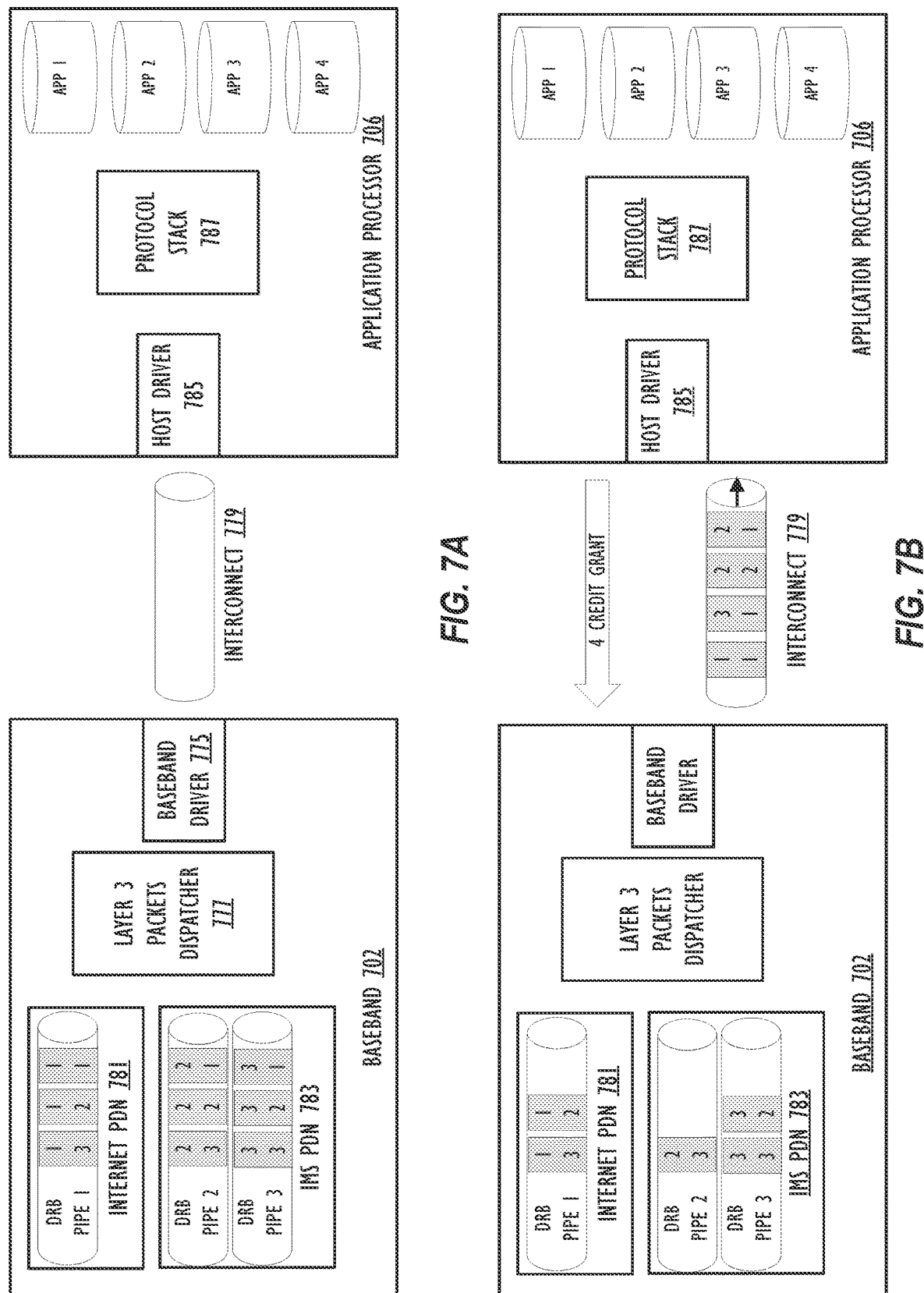
FIGS. 7A, 7B, 7C, and 7D illustrate another example of a DL-CDP process, according to some aspects.

As shown in FIG. 7A, after the DL-CDP is enabled, each DRB includes data to be transmitted to an appropriate application in the application processor 706. The data is shown by the shaded blocks as three credits (e.g., packets) in each DRB, with the top number indicating the pipe and the bottom number indicating a credit index for the DRB.

The application processor 706 includes a host driver 785 and a protocol stack 787 to facilitate the transmission of credits to the appropriate application, demonstrated by APP 1, APP 2, APP 3, and APP 4.

In FIG. 7B, the application processor 706 provides a 4 credit grant to the baseband. In accordance with embodiments, the baseband 702 assigns a minimum of one credit to each Rule as a first pass. Accordingly, credits $$\frac{1}{1}, \frac{2}{1}, \text{ and } \frac{3}{1}$$

are transmitted to the interconnect 779. Then, based on the policy, the baseband 702 assigns the remaining credit to Rule 1, moving credit, $$\frac{2}{1}$$

to the interconnect 779. Although the credits are shown in the interconnect 779 in an order grouped by DRB and listed by priority, embodiments are not limited as such. The credits may be in the order in which they were assigned to the interconnect 779, or they may be in any other order in the interconnect.

Figures 7C, 7D:
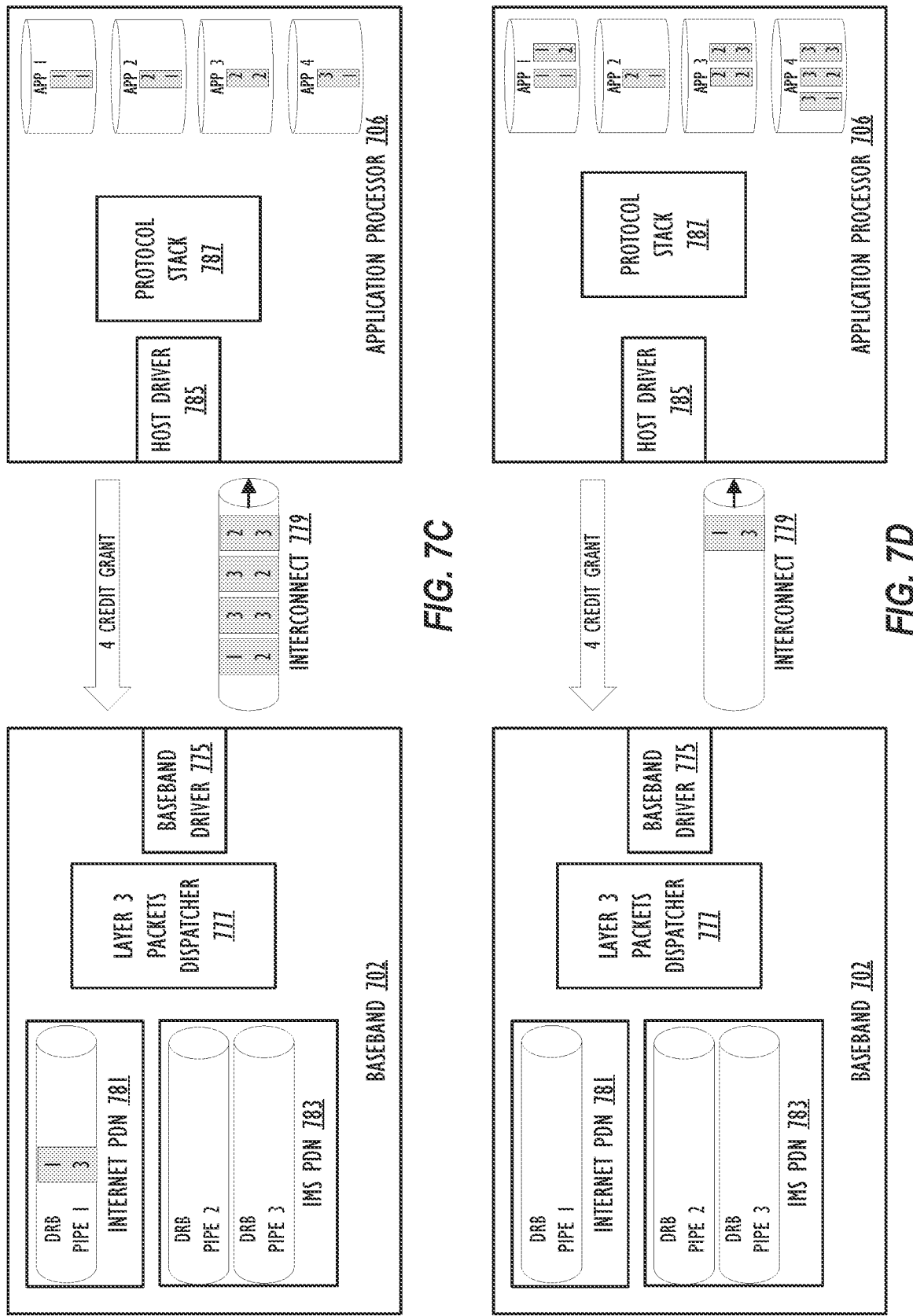

As shown in FIG. 7C, the credits in the interconnect 779 of FIG. 7B are distributed to the appropriate APPs in the application processor 706. In FIG. 7C, another 4-credit grant is provided to the baseband 702. In accordance with embodiments, the baseband 702 assigns a minimum of one credit to each Rule as a first pass. Thus, credits $$\frac{1}{2}, \frac{2}{3}, \text{ and } \frac{3}{2}$$

are transmitted to the interconnect 779. The process then continues with a second pass. In the second pass of FIG. 7C, based on the policy, it is determined that Rule 1 has no data for transmission (i.e., pipe 2 is empty). Then, the remaining credit available for the grant is associated with Rule 2, and credit, $$\frac{3}{3}$$

is moved to tie interconnect 779.

As shown in FIG. 7D, the credits in the interconnect 779 of FIG. 7C are distributed to the APPs in the application processor 706. In FIG. 7D, another 4 credit grant is received by the baseband 702. The baseband 702 assigns a minimum of one credit to each Rule as a first pass, resulting in the final credit $$\frac{1}{3}$$

to be moved to the interconnect 779. The final credit $$\frac{1}{3}$$

would then be moved to an appropriate APP in the application processor 706.

To further demonstrate, the inventors have explored various adversities and DL conditions according to embodiments disclosed herein. A TCP dump, modem protocol logging, and/or network packet capture (PCAP) files may be used to determine the order of packets (i.e., credits) received during adverse conditions. Such information can be used to verify the DL traffic prioritization according to embodiments disclosed herein.

For example, a UE may be placed in adverse scenario, and a different type of DL traffic may be started. More specifically, a UE may be in a low battery state, for example, with less than 5% battery power remaining. The UE may then start downloading a large file, for example, 1 GB. Further, the UE may then start the Intelligent Assistant application.

Prior to embodiments disclosed herein, one would expect both applications (the Intelligent Assistant and the download) to receive data in any order. According to embodiments disclosed herein, via a determined policy, the Intelligent Assistant application may always receive data prior to the file download.

Alternatively, a UE may start a large file download, for example 1 GB. Then, the temperature of the UE may be risen, for example by exposure to direct sunlight, to the point that a thermal warning is issued. Following the warning, the Intelligent Assistant application may be started.

Prior to embodiments disclosed herein, one would expect both applications (the Intelligent Assistant and the download) to receive data in any order, or neither application will receive data. That is, the same behavior would be applied to both applications. According to embodiments disclosed herein, via a determined policy, the Intelligent Assistant application would be prioritized over the file download.

As another example, a UE may start multiple UDP applications with a large file download. This may occur if multiple applications are opened until the memory usage becomes high without retransmission. Retransmissions may be seen at the network stack. Then, a TCP UL application may be started. Prior to embodiments herein, one would expect the applications to receive data in any order. According to embodiments disclosed herein, as determined by a policy, the TCP ACK may be prioritized over the UDP traffic.

As previous noted, the policy may be dynamic. During operation, it is likely, although not required, that the policy will be updated. For example, if a new flow is added to the DL. Regardless of the priority of the new flow, embodiments disclosed herein ensure fairness as embodied by the first pass. If the priority of the new flow is the same as the priority of an existing flow, in some embodiments, the new flow may be prioritized over the old flow with the same priority.

As an example of dynamic updating of the policy, a UE is in an adverse state, and a TCP DL transfer is started. Then, an UDP DL transfer is started. In this example, the UE receives the TCP DL traffic faster than the UDP traffic, which is an indication of an existing policy being enacted. That is, some prioritization algorithm is working because the TCP DL traffic is prioritized over the UDP traffic.

If a new application is started with a priority higher than the TCP DL traffic, such as an Intelligent Assistant or a voice application, embodiments would prioritize the new application over the TCP DL traffic dynamically. If a new application is started with the same priority, such as starting another TCP DL application, embodiments may prioritize the new TCP traffic over the old TCP traffic in accordance with embodiments disclosed herein.

The embodiments disclosed herein have the advantage of dynamically prioritizing data in the DL when a device is in adversity. As such, critical applications may not be penalized in adverse conditions. Further, throughput degradation and multiple retransmissions may be avoided. Embodiments further have the advantage of avoiding longer times to set up voice calls when a device is in duress. By using the fairness of the distribution of data in accordance with embodiments disclosed herein, services may be maintained and critical applications will not be starved.

Aspects of the present disclosure may be realized in any of various forms. For example, some aspects may be realized as a computer-implemented method, a computer-readable memory medium, or a computer system. Other aspects may be realized using one or more custom-designed hardware devices such as ASICs. Still other aspects may be realized using one or more programmable hardware elements such as FPGAs.

In some aspects, a non-transitory computer-readable memory medium may be configured so that it stores program instructions and/or data, where the program instructions, if executed by a computer system, cause the computer system to perform a method (e.g., any of a method aspects described herein, or, any combination of the method aspects described herein, or any subset of any of the method aspects described herein, or any combination of such subsets).

In some aspects, a device (e.g., a UE 106, a BS 102) may be configured to include a processor (or a set of processors) and a memory medium, where the memory medium stores program instructions, where the processor is configured to read and execute the program instructions from the memory medium, where the program instructions are executable to implement any of the various method aspects described herein (or, any combination of the method aspects described herein, or, any subset of any of the method aspects described herein, or, any combination of such subsets). The device may be realized in any of various forms.

Although the aspects above have been described in considerable detail, numerous variations and modifications will become apparent to those skilled in the art once the above disclosure is fully appreciated. It is intended that the following claims be interpreted to embrace all such variations and modifications.

What is claimed is:

1. A method for transmitting credits in a downlink (DL), the method comprising:

detecting adversity associated with the DL, wherein the adversity detected comprises at least one of the following conditions being associated with the DL: (a) a high central processing unit (CPU) load; (b) a memory shortage; (c) network congestion; (d) an interconnect speed threshold not being exceeded; (e) a thermal threshold of a component being exceeded; or (f) suboptimal physical layer conditions;

in response to the adversity, determining a policy associated with the DL, wherein the policy comprises a number of ranked rules, wherein each ranked rule comprises a ranking of a category of application according to a corresponding priority level, and wherein the policy defines how DL credits should be distributed among the number of ranked rules;

enabling the policy;

receiving an indication of a number of available DL credits that may be received by an Application Processor (AP); and transmitting, to the AP and according to the policy's definition of how DL credits should be distributed, a number of DL credits equal to the number of available DL credits.

2. The method of claim 1, wherein transmitting the number of DL credits equal to the number of available DL credits according to the policy's definition of how DL credits should be distributed comprises performing a first pass and a second pass, the first pass comprising:

determining a minimum number of DL credits per ranked rule of the policy; and transmitting DL credits equal to the minimum number of DL credits per ranked rule for each ranked rule of the policy, wherein, when there is no DL credit associated with a specific ranked rule, no data is downloaded for the specific rule.

3. The method of claim 2, wherein the minimum number of DL credits per ranked rule is determined by dividing a portion of the number of available DL credits by the number of ranked rules in the policy.

4. The method of claim 2, wherein the second pass comprises:

starting at a highest-ranked rule, transmitting as many of the DL credits associated with the highest-ranked rule as allowed by the number of available DL credits remaining after the first pass; and after transmitting all the DL credits associated with the highest-ranked rule, proceeding to the next-highest ranked rule in the policy and transmitting as many of the DL credits associated with the next-highest ranked rule as allowed by the number of available DL credits remaining after the first pass and higher-ranked rules.

5. The method of claim 1, further comprising: dynamically updating the policy based, at least in part, on a detected change in downlink conditions.

6. The method of claim 5, wherein dynamically updating the policy comprises incorporating a new ranked rule into the policy.

7. The method of claim 5, wherein the detected change in downlink conditions comprises the addition of a new flow in the DL.

8. The method of claim 1, wherein enabling the policy comprises exchanging the policy between the BB and AP over data path logical channel.

9. The method of claim 1, wherein the DL credit refers to a packet or a pre-determined number of bytes.

10. The method of claim 1, wherein detecting the adversity comprises performing at least one of the following:

monitoring DL data delivery to end-user applications;

monitoring an amount of time that a DL credit resides in a queue;

monitoring a load utilization factor of a CPU on the AP;

monitoring the thermal condition of the AP; and monitoring available power to the AP.

11. The method of claim 1, wherein the policy is determined based, at least in part, on a type of each application associated with the DL.

12. A User Equipment (UE) comprising:

an Application Processor (AP) configured to perform a method, the method comprising:

detecting adversity associated with a downlink (DL), wherein the adversity detected comprises at least one of the following conditions being associated with the DL: (a) a high central processing unit (CPU) load; (b) a memory shortage; (c) network congestion; (d) an interconnect speed threshold not being exceeded; (e) a thermal threshold of a component being exceeded; or (f) suboptimal physical layer conditions;

in response to the adversity, determining a policy associated with the DL, wherein the policy comprises a number of ranked rules, wherein each ranked rule comprises a ranking of a category of application according to a corresponding priority level, and wherein the policy defines how DL credits should be distributed among the number of ranked rules;

enabling the policy;

transmitting, to a baseband (BB), an indication of a number of available DL credits that may be received by the AP; and downloading, according to the policy's definition of how DL credits should be distributed, a number of DL credits equal to the number of available DL credits.

13. The UE of claim 12, wherein the policy is determined based, at least in part, on a type of each application associated with the DL.

14. The UE of claim 12, wherein the policy is determined based, at least in part, on a relative age of a flow associated with the DL.

15. The UE of claim 12, the method further comprising: dynamically updating the policy based, at least in part, on a detected change in downlink conditions.

16. A network device comprising:

a Baseband (BB) configured to perform a method, the method comprising:

detecting adversity associated with a downlink (DL), wherein the adversity detected comprises at least one of the following conditions being associated with the DL: (a) a high central processing unit (CPU) load, (b) a memory shortage; (c) network congestion; (d) an interconnect speed threshold not being exceeded; (e) a thermal threshold of a component being exceeded; or (f) suboptimal physical layer conditions;

in response to the adversity, determining a policy associated with the DL, wherein the policy comprises a number of ranked rules, wherein each ranked rule comprises a ranking of a category of application according to a corresponding priority level, and wherein the policy defines how DL credits should be distributed among the number of ranked rules;

enabling the policy;

receiving an indication of a number of available DL credits that may be received by an Application Processor (AP); and transmitting, to the AP and according to the policy's definition of how DL credits should be distributed, a number of DL credits equal to the number of available DL credits.

17. The network device of claim 16, wherein transmitting the number of DL credits equal to the number of available DL credits according to the policy's definition of how DL credits should be distributed comprises performing a first pass and a second pass, the first pass comprising:

determining a minimum number of DL credits per rule; and transmitting DL credits equal to the minimum number of DL credits per ranked rule for each ranked rule of the policy, wherein, when there is no DL credit associated with a specific rule, no data is downloaded for the specific rule.

18. The network device of claim 17, wherein the minimum number of DL credits per rule is determined by dividing half of the number of available DL credits by the number of ranked rules in the policy.

19. The network device of claim 16, wherein the second pass comprises:

starting at a highest-ranked rule, transmitting as many of the DL credits associated with the highest-ranked rule as allowed by the number of available DL credits remaining after the first pass; and after transmitting all the DL credits associated with the highest-ranked rule, proceeding to the next highest-ranked rule in the policy and transmitting as many of the DL credits associated with the next highest-ranked rule as allowed by the number of available DL credits remaining after the first pass and higher ranked rules.

20. The network device of claim 16, the method further comprising:

dynamically updating the policy based, at least in part, on a detected change in downlink conditions.

\* \* \* \* \*